US011900463B2

(12) United States Patent
Kawamori

(10) Patent No.: US 11,900,463 B2
(45) Date of Patent: Feb. 13, 2024

(54) ENTERPRISE PORTFOLIO MANAGEMENT SYSTEM

(71) Applicant: Persefoni AI Inc., Mesa, AZ (US)

(72) Inventor: Kentaro M. Kawamori, Tempe, AZ (US)

(73) Assignee: Persefoni AI Inc., Mesa, AZ (US)

( * ) Notice: Subject to any disclaimer, the term of this patent is extended or adjusted under 35 U.S.C. 154(b) by 0 days.

(21) Appl. No.: 17/404,691

(22) Filed: Aug. 17, 2021

(65) Prior Publication Data
US 2022/0230250 A1    Jul. 21, 2022

Related U.S. Application Data

(60) Provisional application No. 63/066,646, filed on Aug. 17, 2020, provisional application No. 63/066,651, filed on Aug. 17, 2020.

(51) Int. Cl.
*G06Q 40/06* (2012.01)
*G06N 20/00* (2019.01)
*G06Q 30/018* (2023.01)

(52) U.S. Cl.
CPC ............. *G06Q 40/06* (2013.01); *G06N 20/00* (2019.01); *G06Q 30/018* (2013.01)

(58) Field of Classification Search
CPC ................................ G06Q 40/06; G06N 20/00
USPC .......................................................... 705/36
See application file for complete search history.

(56) References Cited

U.S. PATENT DOCUMENTS

| 7,877,235 | B2 | 1/2011 | McConnell |
| 7,930,144 | B2 | 4/2011 | McConnell |
| 8,165,891 | B2 | 4/2012 | Roberts |
| 8,521,476 | B2 | 8/2013 | Tung |
| 8,768,750 | B2 | 7/2014 | Clark |
| 2006/0020502 | A1 | 1/2006 | Trout |
| 2006/0089851 | A1 | 4/2006 | Silby |
| 2006/0100897 | A1 | 5/2006 | Halloran |
| 2009/0210295 | A1 | 8/2009 | Edholm |
| 2011/0060612 | A1 | 3/2011 | Mercer |
| 2011/0060614 | A1 | 3/2011 | Clark |
| 2011/0071867 | A1 | 3/2011 | Chen |

(Continued)

FOREIGN PATENT DOCUMENTS

WO    2012044953 A1    4/2012

*Primary Examiner* — Calvin L Hewitt, II
*Assistant Examiner* — Amanulla Abdullaev
(74) *Attorney, Agent, or Firm* — Kilpatrick Townsend & Stockton LLP

(57) ABSTRACT

An accountability management system for determining an accountability in terms of a responsibility score for an investor of an enterprise. First footprint for a first node and second footprint for a second node are determined. A first fraction of the first footprint and a second fraction of the second footprint is allocated to the enterprise whose transaction from the first node and the second node defines the first fraction and the second fraction. A first degree, a second degree, and a third degree are determined. An aggregate offset attributable to the enterprise is determined from the first, the second, and the third degree. The responsibility score is determined for the investors based on the aggregate offset. Changes to the data sources, the first node, the second node, or a connection between the first node and the second node leads to updating of the aggregate offset and the responsibility score.

12 Claims, 14 Drawing Sheets

(56) References Cited

U.S. PATENT DOCUMENTS

| | | |
|---|---|---|
| 2011/0295609 A1 | 12/2011 | Koponen |
| 2013/0035973 A1 | 2/2013 | Desai |
| 2014/0052303 A1 | 2/2014 | Venkatakrishnan |
| 2015/0127391 A1* | 5/2015 | Bellowe ............... G06Q 10/30 |
| | | 705/5 |
| 2015/0310450 A1 | 10/2015 | Fairbanks |
| 2016/0246271 A1* | 8/2016 | Shen .................... G06Q 10/063 |
| 2016/0342922 A1 | 11/2016 | McCarthy |
| 2017/0357250 A1* | 12/2017 | Sandler ............... G06Q 10/00 |
| 2019/0066217 A1* | 2/2019 | Stoner, Jr. ............ G06Q 40/06 |
| 2020/0027096 A1* | 1/2020 | Cooner ................ G06Q 40/04 |
| 2021/0279777 A1* | 9/2021 | Jenks .................. G06Q 20/145 |

* cited by examiner

ENTERPRISE PORTFOLIO MANAGEMENT SYSTEM

This application is a non-provisional of and claims the benefit of U.S. Provisional Application No. 63/066,646, filed on Aug. 17, 2020 and U.S. Provisional Application No. 63/066,651, filed on Aug. 17, 2020, both of which are incorporated herein by reference in their entirety for all purposes.

BACKGROUND

Investors are liable to responsibilities pertaining to environmental issues associated with an enterprise in which they make investments. The environmental issues such as carbon emissions are of growing concern for enterprises. Under various government standards such as the greenhouse gas (GHG) protocol, enterprises are required to measure and report their greenhouse gas emissions. The enterprises are accountable for their carbon emissions. Carbon taxes, cap and trade, Clean Air Act regulations, energy-efficiency standards, and carbon offsets are imposed on the businesses and individuals to account for their pollution and tons of greenhouse gases they emit.

Accountability for the carbon emissions has to be appropriately defined at each hierarchical level of the enterprise for a fair distribution of the accountability. Established systems today entail enterprises to adhere to their data structure with severe limitations on being able to reflect the hierarchy as it exists in their organizations today and cannot accommodate the variety of 'snowflake' patterns as every schema is different. Further, investors consider environmental, social, and governance (ESG) factors while making investment decisions and managing their active portfolios. Climate issues are central to this with emission metrics being the most imperative parameter. Greenhouse gas emissions data is used to calculate a carbon footprint which in turn is used to compare performance in that category relative to industry and peers.

Moreover, businesses and consumers also face social stigma and financial losses if they are not serious regarding the carbon emissions. Investors are more conscious these days while investing in enterprises with carbon offset liability being an important parameter for consideration before making any investments. The businesses may generally take steps, such as switching fuels or adopting new technologies, to reduce their carbon emissions and avoid paying the carbon taxes.

SUMMARY

In one embodiment, the disclosure provides an accountability management system for determining an accountability in terms of a responsibility score for an investor of an enterprise. First footprint for a first node and second footprint for a second node are determined. A first fraction of the first footprint and a second fraction of the second footprint is allocated to the enterprise whose transaction from the first node and the second node defines the first fraction and the second fraction. A first degree, a second degree, and a third degree are determined. An aggregate offset attributable to the enterprise is determined from the first, the second, and the third degree. The responsibility score is determined for the investors based on the aggregate offset. Changes to the data sources, the first node, the second node, or a connection between the first node and the second node leads to updating of the aggregate offset and the responsibility score.

In an embodiment, the disclosure provides an accountability management system for determining an accountability in terms of a responsibility score for an investor of an enterprise, the accountability management system includes a processing engine configured to determine first footprint for a first node of a plurality of nodes from data sources. Second footprint for a second node of the plurality of nodes is determined from the data sources. A first fraction of the first footprint is allocated to the enterprise whose transaction from the first node defines the first fraction. A second fraction of the second footprint is allocated to the enterprise whose transaction from the second node defines the second fraction. A first degree and a second degree for the enterprise are determined from the data sources. A third degree for the enterprise is calculated as a function of the first fraction and the second fraction. An aggregate offset attributable to the enterprise is determined from the first degree, the second degree and the third degree. The aggregate offset is allocated to investors in the enterprise. The responsibility score for the investors based on the aggregate offset is determined. Changes to one of the data sources, the first node or the second node, or a connection between the first node and the second node is identified. An updated aggregate offset attributable to the enterprise is determined from the first degree, the second degree, and the third degree based on the change. The responsibility score is modified based on the updated aggregate offset.

In another embodiment, the disclosure provides a method for determining a responsibility score in real-time for an investment portfolio of an enterprise. In one step, first footprint for a first node of a plurality of nodes from data sources and second footprint for a second node of the plurality of nodes from the data sources are determined. A first fraction of the first footprint is allocated to the enterprise whose transaction from the first node defines the first fraction. A second fraction of the second footprint is allocated to the enterprise whose transaction from the second node defines the second fraction. A first degree and a second degree for the enterprise are determined from the data sources. A third degree is determined for the enterprise as a function of the first fraction and the second fraction. An aggregate offset attributable to the enterprise is determined from the first degree, the second degree and the third degree. The aggregate offset is allocated to investors in the enterprise. The responsibility score for the investors is determined based on the aggregate offset. Changes to one of the data sources, the first node or the second node, or a connection between the first node and the second node are identified. An updated aggregate offset attributable to the enterprise from the first degree, the second degree, and the third degree based on the change is determined. The responsibility score is modified based on the updated aggregate offset.

In yet another embodiment, the disclosure provides an accountability determination system for nodes and investors of an enterprise, the accountability determination system comprising a plurality of servers, collectively having code for:

determining first footprint for a first node of a plurality of nodes from data sources;
determining second footprint for a second node of the plurality of nodes from the data sources;
allocating a first fraction of the first footprint to the enterprise whose transaction from the first node defines the first fraction;

allocating a second fraction of the second footprint to the enterprise whose transaction from the second node defines the second fraction;

determining a first degree and a second degree for the enterprise from the data sources;

calculating a third degree for the enterprise as a function of the first fraction and the second fraction;

determining an aggregate offset attributable to the enterprise from the first degree, the second degree and the third degree;

allocating the aggregate offset to investors in the enterprise;

determining a responsibility score for the investors based on the aggregate offset;

identifying change to one of the data sources, the first node or the second node, or a connection between the first node and the second node; and determining an updated aggregate offset attributable to the enterprise from the first degree, the second degree, and the third degree based on the change, wherein the responsibility score is modified based on the updated aggregate offset.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second alphabetical label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
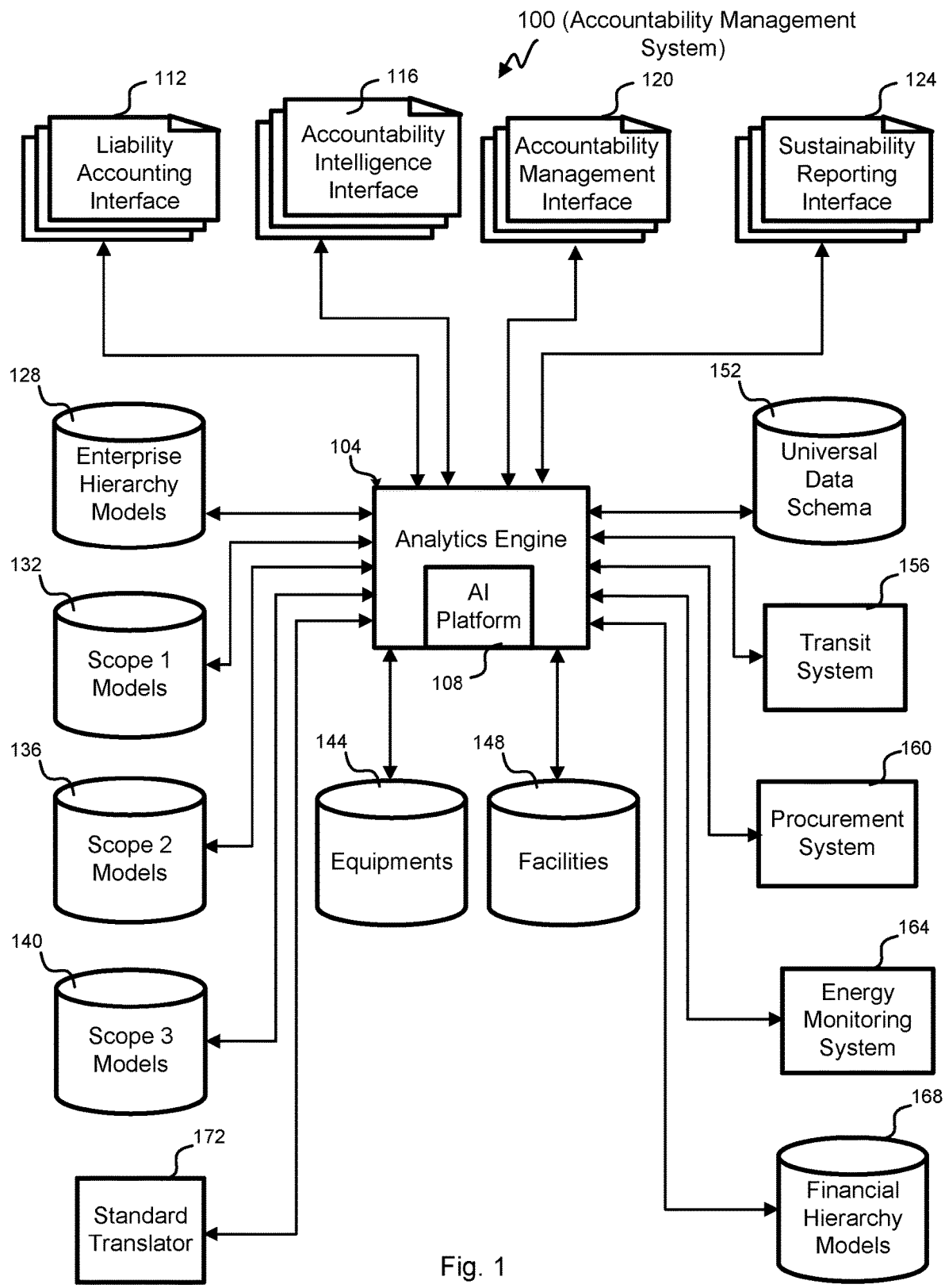
FIG. 1 illustrates an embodiment of a block diagram of an accountability management system or an accountability determination system.

Referring initially to FIG. 1, an embodiment of a block diagram of an accountability management system 100 (or an accountability determination system) is shown. The accountability management system 100 determines accountability in the form of a responsibility score for each individual, team, level, and/or business unit of an enterprise. The accountability can be related to wastage, electricity use, carbon emissions, or pollution. The accountability management system 100 includes various components such as an analytic engine 104 with an artificial intelligence (AI) platform 108, a liability accounting interface 112, an accountability intelligence interface 116, an accountability management interface 120, a sustainability reporting interface 124, an enterprise hierarchy models 128, scope 1 models 132, scope 2 models 136, scope 3 models 140, equipments 144, facilities 148, universal data schema 152, a transit system 156, a procurement system 160, an energy monitoring system 164, financial hierarchy models 168, and a standard-translator 172. The accountability management system 100 or the accountability determination system includes a plurality of servers configured to perform the functions of the various components.

Determination of accountability uses a number of protocols through the liability accounting interface 112 traditionally concentrating on scopes, however, the accountability management system 100 determines the accountability in terms of an aggregate offset which is determined based on an organizational hierarchical network. The sustainability reporting interface 124 supports a variety of standards, e.g., Sustainability Accounting Standards Board (SASB) and Streamlined Energy and Carbon Reporting (SECR), at the user's preference. Between the liability accounting interface 112 and the sustainability reporting interface 124 translations can be made between any of the accounting or reporting formats and protocols. The sustainability reporting interface 124 displays the accountability as the responsibility score to users of the accountability management system 100.

An investor can understand what the accountability for their investment portfolio is in real-time by connecting with each of the various companies, vendors, purchasers, and suppliers as nodes in a network that reports to each other. Updates happen periodically or with new data so that the investor understands how they are inheriting the accountability from each investment as part of their own accountability and how that is trending in comparison to past performance.

For example, emission factors are used to extrapolate an accountability footprint model even if no data is provided or otherwise available. In one embodiment, the platform presume poor numbers on bell curve formed from a cohort group if no link to data or periodic updates is provided. To update each node at any frequency, data is interpolated from a trend found in prior reports. Nodes can be opaque to higher levels with permission-based reporting of identifiable information. For example, scope 3 models may be provided for a supplier, but the platform may not identify anything about the supplier without permission.

There are different scopes of emissions accounted for in the accountability management system 100, specifically, there are scope 1, 2 and 3 models 132, 136, 140 to fully capture the degrees or scope associated with the accountability.

Scope 1 models 132 include a number of models to process data from data sources such as that they come directly from company facilities and equipment (e.g., company vehicles) reported by the company. These are emissions, transactions, or emanations where the company owns the asset and controls the activity performed by the asset.

Scope 2 models 136 include a number of models to process data from data sources such as that come from indirect upstream activity, for example, greenhouse gas emissions resulting from the generation of electricity, heat or steam purchased by the company for own use. The company doesn't own the source still controls the activity of the source.

Scope 3 models 140 include a number of models to process direct and indirect data from the data sources, for example, the processed data can be indirect greenhouse gases from sources not owned or directly controlled by a company still related to the company's activities. This looks at upstream activities (e.g., purchased goods/services, capital goods, fuel and energy-related activities, business travel and employee commuting, waste generated in operations, etc.), both upstream and downstream activities (e.g., leased assets, transportation, distribution, etc.), and downstream activities (e.g., investments, processing of sold products and use of sold products, end-of-life treatment of sold products, franchises, wastewater treatment, etc.).

The scope 1, 2, and 3 models 132, 136, and 140 processes the data from their respective data sources to determine a first degree, a second degree, and a third-degree associated with the footprint, respectively which defines the data from their respective data sources. The processed data is provided to the analytics engine 104 for processing.

The accountability management interface 120 measures accountability in real-time and determines how to manage that more efficiently such that the accountability may be reduced. The accountability management interface 120 gives energy management recommendations, which generally reduces the accountability. For example, it might see a pattern of electric vehicle charging and recommend the charging to occur at night to save electricity cost. Based upon user preference, carbon reduction may be preferred, and the recommendation could be to charge during the day when renewables like wind and solar are available and have a reduced carbon footprint.

The accountability intelligence interface 116 is used to configure the accountability management system 100. Data sources, models and schemas are configured to allow precise simulation and calculation of the accountability or the responsibility score for an enterprise. This could be an aggregate offset attributable to the enterprise or an investment portfolio.

Every enterprise is structured uniquely according to the way the organization organizes its departments, business units, teams, regions, business units, subsidiaries, and has different facilities and locations. A dynamic schema automatically creates a data model specific to tracking and measuring emissions data and footprints according to how the company is structured, rather than a fixed organizational hierarchy. The structure is defined by nodes in a hierarchy that has different layers. The nodes can be added or removed along with additional layers with dynamic links between them modifiable by the user to move around node interconnections. The dynamic schema allows for an infinite number of permutations of enterprise models based on how the user organization structures the relationships between the individual data objects it creates. That data model can then be equally flexible and can be used to export data into any chosen format and attribute it in various ways between nodes. Emissions are tied to a resource group. Dynamic inheritance of emissions by boundary principles (defined percentages) for each node improves the data model. Some embodiments use machine learning (ML) to dynamically reallocate the footprint where information is missing or out-of-date.

The analytics engine 104 gathers much of the information and performs the processing for the accountability management system 100. The AI platform 108 allows the use of machine learning to do activities such as select a cohort group of similar companies, predict emission values when the data is missing or out of date, etc.

The standard-translator 172 changes formats and protocols for the footprints into any accounting or reporting standard. Where data is gathered in one format, the standard-translator 172 converts it into a universal data schema 152 for processing with the analytics engine 104. After processing, the standard-translator 172 convert it back into the original format or any other format supported by the accountability management system 100.

The enterprise hierarchy models 128 defines a network of interconnected nodes to calculate the accountability/responsibility score in real-time and how to allocated it through the layers of the hierarchy. Real-time is defined to mean that the enterprise hierarchy models 128 is updated whenever new data is read, the model is changed, or according to a predetermined schedule. For nodes in the enterprise hierarchy models 128, the data sources such as the transit system 156, the procurement system 160, and the energy monitoring system 164 are referenced to gather data. The organizational hierarchical structure can be obtained by integrating the enterprise hierarchy models 128 with a Human Resource (HR) system or an Enterprise resource planning (ERP) of the organization. The node can be an enterprise or location, for example. Various equipments 144 and facilities 148 are specified to further define the enterprise hierarchy models 128. Each node in the hierarchical structure is defined to higher nodes in the hierarchical structure with one or more equity shares, operational control, and financial control.

The data is gathered from the data sources via the user interfaces. The data can be either uploaded or entered by a user or an administrator of the enterprise or can be extracted using Application Programming Interfaces (APIs) or can be provided using Comma Separated Values (CSV) files. The transit system 156, the procurement system 160 and the energy monitoring system 164, the HR system, or the ERP system can provide the data. The HR and ERP obtained data is coupled with the legal entities of the enterprise. The legal entities are structured underneath any specific node that can change the inheritance. Calculations from one node to the next are based on ownership percentages and other factors. In case the enterprise hides misleads, or provides incorrect or insufficient data from the ERP or HR system, penalties in the form of fines can be imposed. Further, a responsibility score and a confidence score are determined based on the insufficient or incorrect data and highlighted to users of the discrepancies. The investors become aware of the discrepancies and can take decisions accordingly.

The transit system 156 can be a travel or commute system or database of the enterprise which provides logs of travel done by the personnel of the enterprise within a duration. The transit system 156 provides the travel logs to the analytics engine 104 for further processing.

The procurement system 160 provides data related to the acquisition of goods and/or services to the analytics engine 104. Bills, agreements, credit details, transactions, expenses, and/or account data are part of the procurement data provided to the analytics engine 104.

The energy monitoring system 164 provides energy bills, meter readings, power, and energy monitoring data such as those related to air conditioners, lights, fans, water purifiers, waste management, backup, and/or other kinds of electrical power usage. The energy monitoring system 164 provides the energy monitoring data to the analytics engine 104 for further processing.

The financial hierarchy models 168 are used to determine how to allocate the footprint to investors. A network of companies, suppliers, and customers are defined as nodes. The upstream and downstream scope 1, 2 and 3 models are defined along with how they pass through the nodes such that an investment portfolio can be attributed to/the footprint.

Figure 2:
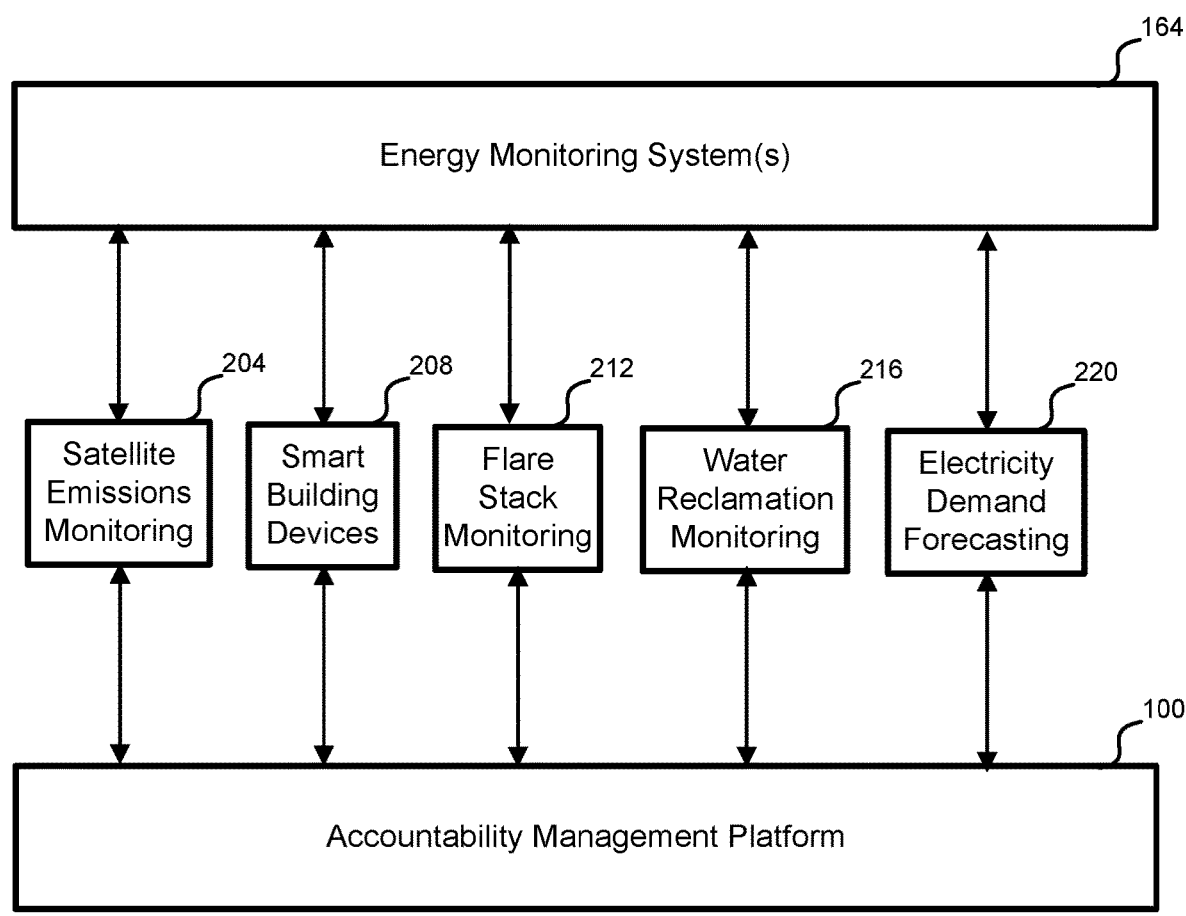
FIG. 2 illustrates an embodiment of an energy monitoring system gathering various energy usage information.

Referring next to FIG. 2, an embodiment of the energy monitoring system 164 is shown gathering various energy usage information. In addition to any data from power utilities, the energy monitoring system 164 gathers information automatically from satellite emissions monitoring 204, smart building devices 208, flare stack monitoring 212, water reclamation monitoring 216, and electricity demand forecasting 220. IoT or other devices can be used to gather this information. The energy usage information is also passed to the accountability management system 100.

Figure 3A:
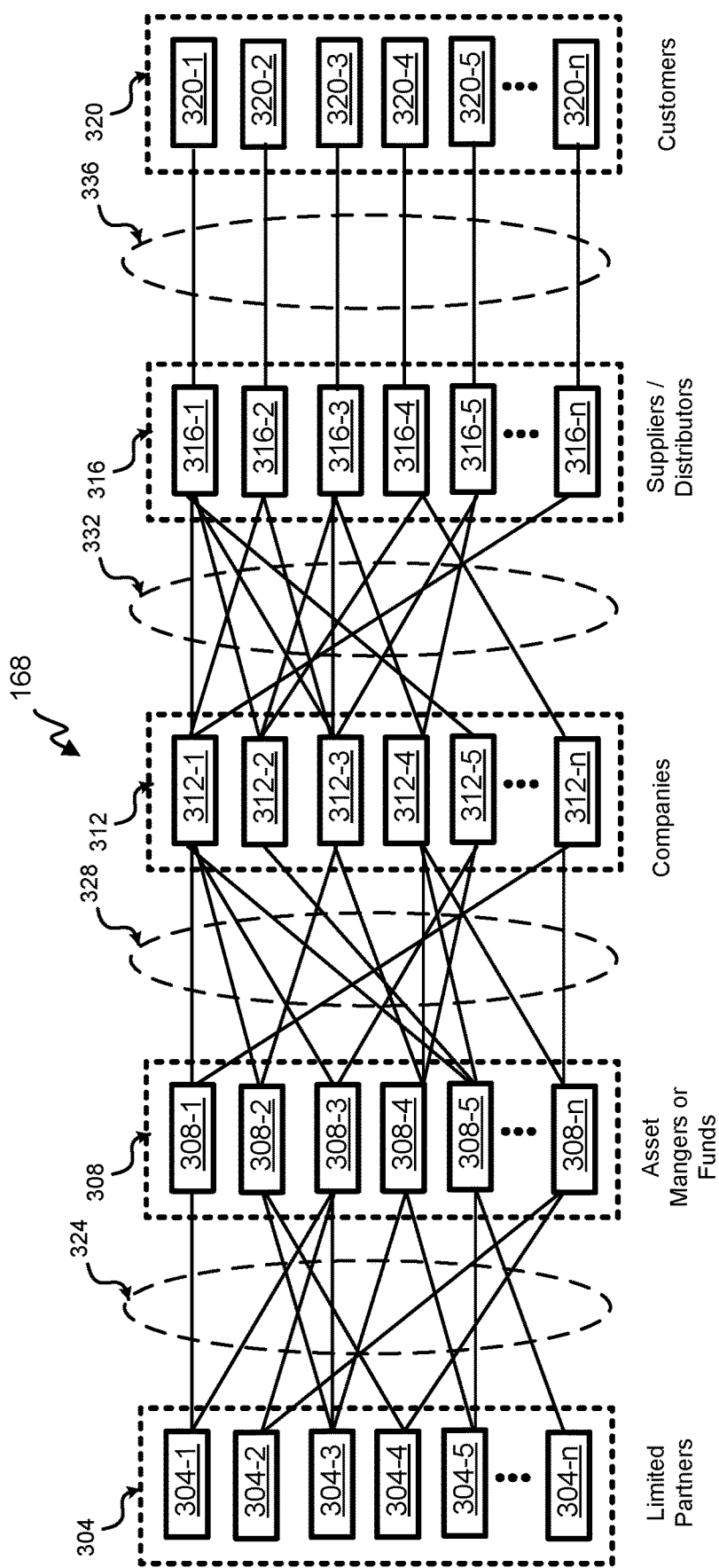
FIGS. 3A-3C illustrates embodiments of financial hierarchy models; Respective reference designators corrected in three FIGS. 3A, 3B, and 3C.
Figure 3B:
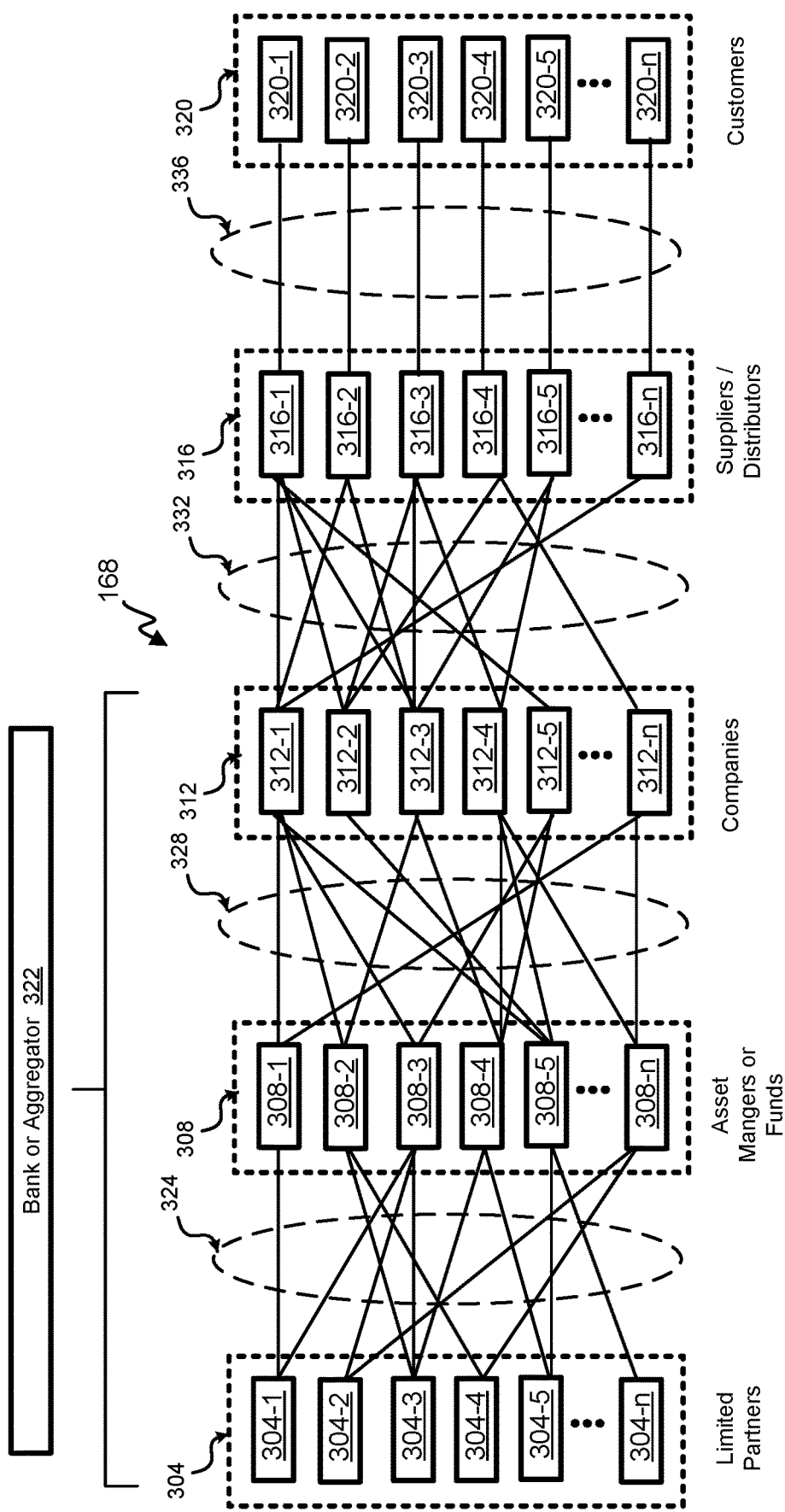
Figure 3C:
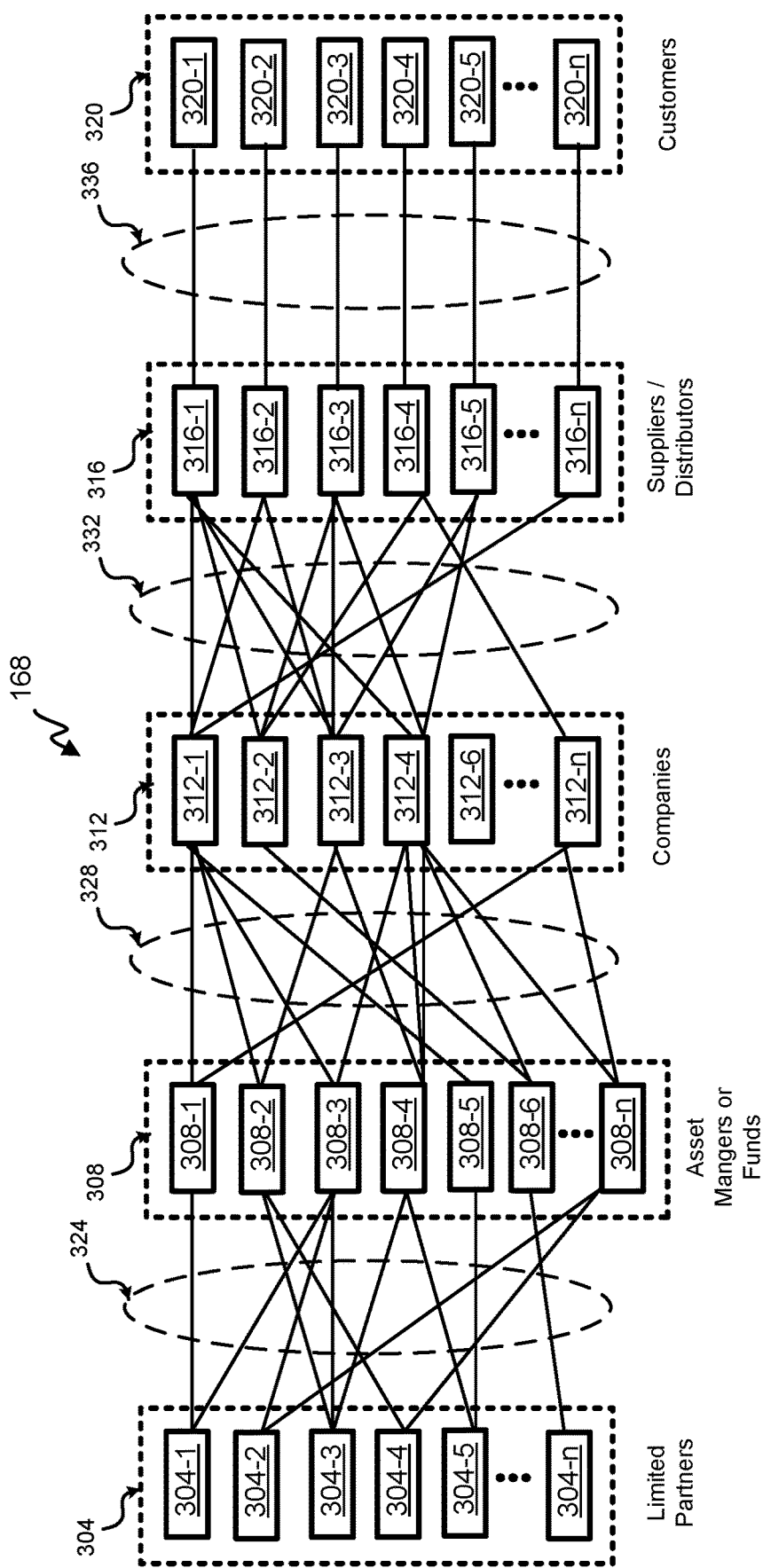

With reference to FIGS. 3A-3C, embodiments of the financial hierarchy models 168 is shown. In FIG. 3A there is a network of nodes 304, 308, 312, 316, 320 and they are interconnected with each other via interconnects 324, 328, 332, 336. The nodes are arranged in layers or tiers with the investor's groups or limited partners 304 on the left and customers 320 on the right with asset managers or funds 308, companies 312, and suppliers/distributors 316 in between. The investor's groups or limited partners 304, the asset managers or funds 308, the companies 312, the suppliers/distributors 316 and the customers 320 represent the nodes 304, 308, 312, 316, and 320.

Each of the interconnects 324, 328, 332, 336 is weighted to define how much accountability to attribute up to the next layer on the left. For example, a first customer 320-1 buys a product from a first supplier or distributor 316-1. The first supplier 316-1 receives products from the first, second, third, and fifth companies 312-1, 312-2, 312-3, 312-5, respectively. Those companies 312 are held by various asset managers or funds 308 in different percentages. The asset managers or funds 308 are invested into by limited partners 304 in different percentages. The investment interconnects 324, 328 are weighted by the percentage of equity held between the two nodes. For example, if a third fund 308-3 holds 10% of the equity of the first company 312, 10% of the accountability would be attributed to the third fund 308-3.

In FIG. 3B, the limited partner 304, the asset manager or fund 308 and the company 312 have purchased loans from a bank or aggregator 322. Since the bank or aggregator 322 lent money to the enterprise, the bank or aggregator 322 also has accountability in the enterprise. For example, if a company 312-1 worth 2 million dollars has borrowed 1 million dollars from the bank 322 then the bank 322 would have a footprint associated with lending the 1 million dollars to the company 312-1. The percentage of footprint or accountability is calculated based on the scope model, the type of data from the company 312-1, and the other factors such as equity and finance.

In FIG. 3C, an investment portfolio associated with the enterprise is changed. One or more nodes and the interrelationship between the nodes is changed which influences the accountability of the enterprise. For example, a node 308-6 and the removal of a node 312-5 have changed the connections between the nodes in the network. Accordingly, the accountability associated with the nodes change thereby changing the accountability of the investor.

Figure 4:
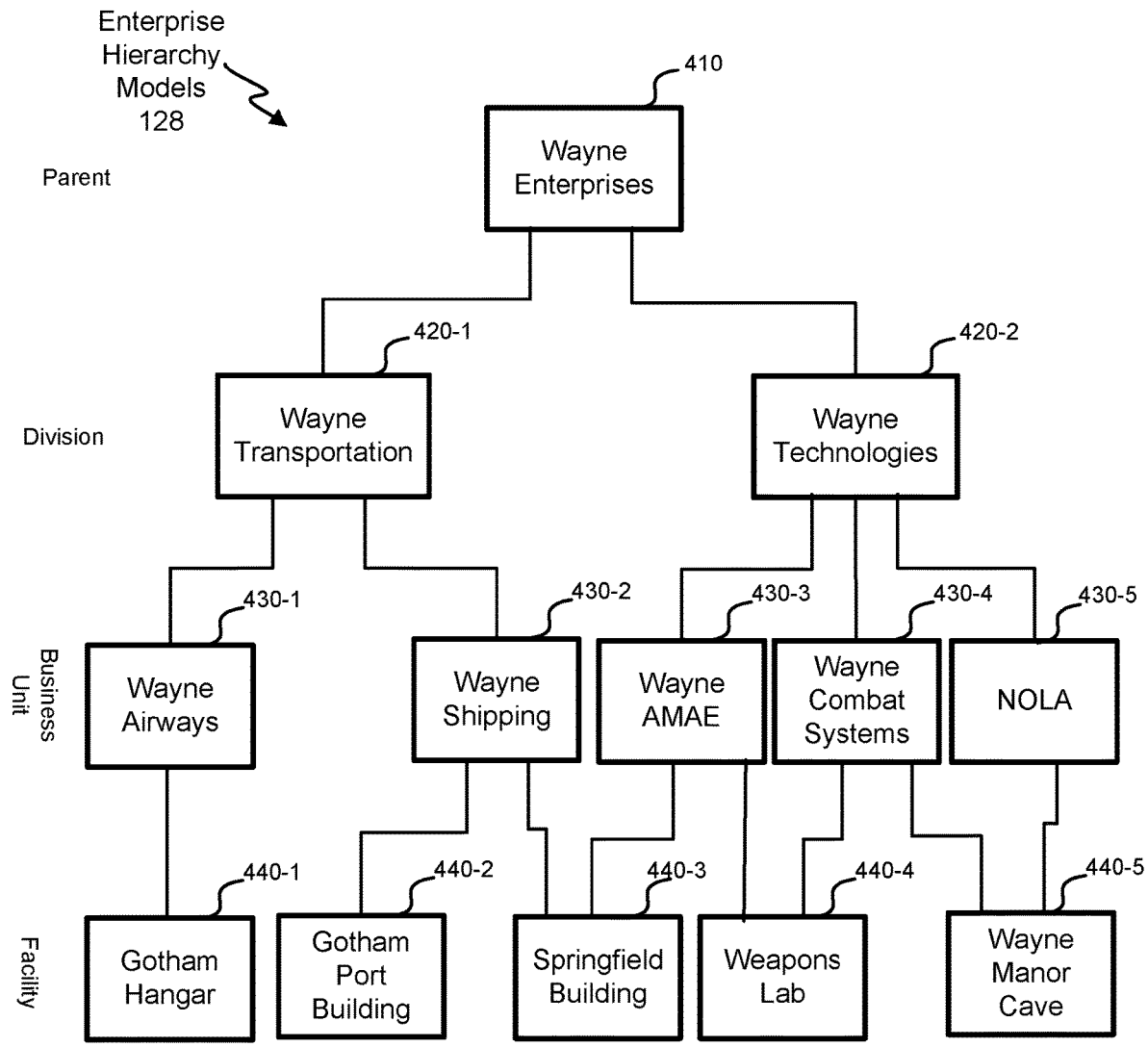
FIG. 4 illustrates an embodiment of enterprise hierarchy models or dynamic schema.

Referring next to FIG. 4, an embodiment of the enterprise hierarchy models 128 or herein referred to as a dynamic schema is shown. Every hierarchy is different with different nodes and layers. Accountability is attributed to the lowest layer, here it is facility 440. The interconnections between layers are each defined by the percentage of equity share, operational control, and/or financial control. Any of these three can be selectively used to attribute accountability up the hierarchy. Above facility 440-1, 440-2, 440-3, 440-4, 440-5 are business unit 430-1, 430-2, 430-3, 430-4, 430-5, 440-5 division 420-1, 420-2, and parent entity 410 at the top. Other embodiments can have any number of layers defining group or sub-groups in the entity and locations or more specific locations for the entity.

Figure 5:
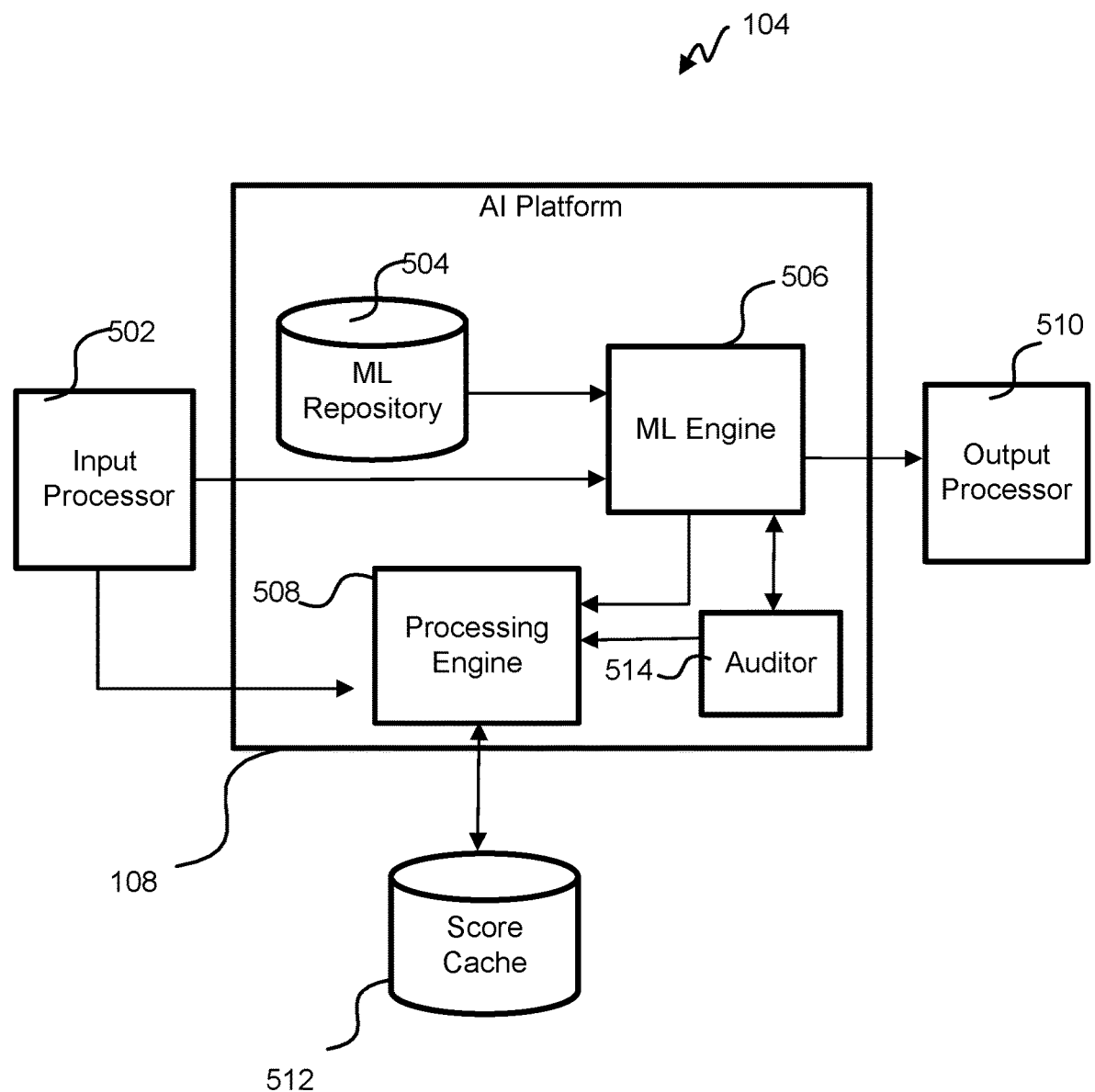
FIG. 5 illustrates an embodiment of an analytics engine.

Referring next to FIG. 5, an embodiment of a block diagram of the analytics engine 104 is shown. The analytics engine 104 is configured to process the gathered data from the transit system 156, the procurement system 160, the energy monitoring system 164, the facilities 148 and the equipments 144, the scope 1, 2, and 3 models 132, 136, and 140 as the data sources. The analytics engine 104 is configured to process the gathered data to determine a responsibility score for each node in a hierarchical network of the enterprise. The responsibility score for each node allows the investors to identify their own accountability in the enterprise. The analytics engine 104 includes an input processor 502, the AI platform 108, an output processor 510, a score cache 512, and an auditor 514. The AI platform 108 includes a machine learning (ML) repository 504, an ML engine 506, and a processing engine 508.

The input processor 502 receives the data gathered from the data sources that is from the transit system 156, the procurement system 160, the energy monitoring system 164, the scope 1, 2, and 3 models 132, 136, and 140, the facilities 148 and the equipments 144 and processes the data that is gathered in one format. The standard-translator 172 converts it into the universal data schema 152 for processing with the analytics engine 104. The input processor 502 acquires the data converted into the standard-format from the standard-translator 172 and provides the data to the ML engine 506. The input processor 502 also receives the data from the scope 1, 2, and 3 models 132, 136, and 140 to categorize the data into a type of source of the data. The input processor 502 further receives data and instructions from the liability accounting interface 112, the accountability intelligence interface 116, and the accountability management interface 120 and provides to the processing engine 508.

The ML engine 506 applies rules on the data to identify ML models for processing the data. The rules identify the ML models based on the type of the data, the node, and the hierarchical level of the node in a hierarchical network of the enterprise. The hierarchical network is obtained from the data sources or the ERP or HR system of the enterprise. For example, based on scope 1 data, node-business unit, and hierarchical level 2 from the bottom, rules identify ML model 1. In another example, based on scope 3 emission data, node-division, and hierarchical level 3, rules identify ML model 4. The ML models are stored in the ML repository 504 and are coupled with the enterprise hierarchy models 128 and the financial hierarchy models 168. The ML engine 506 processes the data from the data sources based on the identified ML model and provides results to the processing engine 508 and the auditor 514.

The auditor 514 takes the processed data from the ML engine 506 to perform audit on the data. The auditor 514 verifies the ML models selected, the gathered data and the interconnections of the nodes. The audit is performed using machine learning that looks for patterns across many different users of the accountability management system 100 to find mistakes and suggest remediation to the ML engine 506. Any discrepancy is reported to the ML engine 506 and checked until its remediated. The audited data is provided to the processing engine 508 so that the processing engine 508 is assured of receiving the correct data.

The processing engine 508 receives the data processed with the ML model and the data from the input processor 502 to determine a responsibility score and a confidence score. The data sources, models, and schemas are configured using the accountability intelligence interface 116 for the calculation of the accountability or the responsibility score for the enterprise. The accountability management interface 120 provides a measurement of the accountability and suggestions to manage it efficiently. The liability accounting interface 112 provides various standards for the calculation of the responsibility score. The processing engine 508 determines footprints for each node in the hierarchy, a fraction of the footprint is allocated to the enterprise whose transaction from the node defines the fraction. A first degree and a second degree of the node are determined from the data sources. Further, a third-degree is determined from the fraction. An aggregate offset attributable to the enterprise is determined from the first degree, the second degree, and the third degree. The aggregate offset is allocated to investors of the enterprise. The responsibility score is determined based on the aggregate offset. A respective responsibility score is also calculated for each node. For example, if the aggregate offset for the investor is determined to be 1,056,789 $MtCO_2e$ and the footprint for nodes to be 5,059,789 $MtCO_2e$ then the responsibility score is determined as 4 on a scale of 10 with 10 being highest and 1 being the lowest score.

The lower the responsibility score, the less accountable the investor is in the enterprise for the accountability. The responsibility scores from the past are stored in the score cache 512. The current responsibility score is compared with the past responsibility scores to generate a confidence score which is used by the investor to analyze their accountability in the enterprise over time. For example, if the past responsibility scores are 5, 4.3, 7, and 3 which are compared with the current responsibility score of 4, the confidence score turns out to be 4.1. If the responsibility score turned out to be say a range between 5-10, then the confidence score would have decreased. The aggregate offset, the responsibility score, and the confidence score are stored in the score cache 512. The aggregate offset, the responsibility score, and the confidence score are provided to the output processor 510.

The output processor 510 standardizes the gathered data, the aggregate offset, the responsibility score, and the confidence score for a display to the user. The output processor 510 receives the data converted into the original form from the standard-format from the standard-translator 172. The output processor 510 provides the converted data for display. The output processor 510 also standardizes reports based on a standard, for example, pdf, excel, text files, or graphs obtained of the sustainability reporting interface 124. The sustainability reporting interface 124 displays the gathered data, the aggregate offset, the responsibility score, and the confidence score in an appropriate format to the user.

Figure 6A:
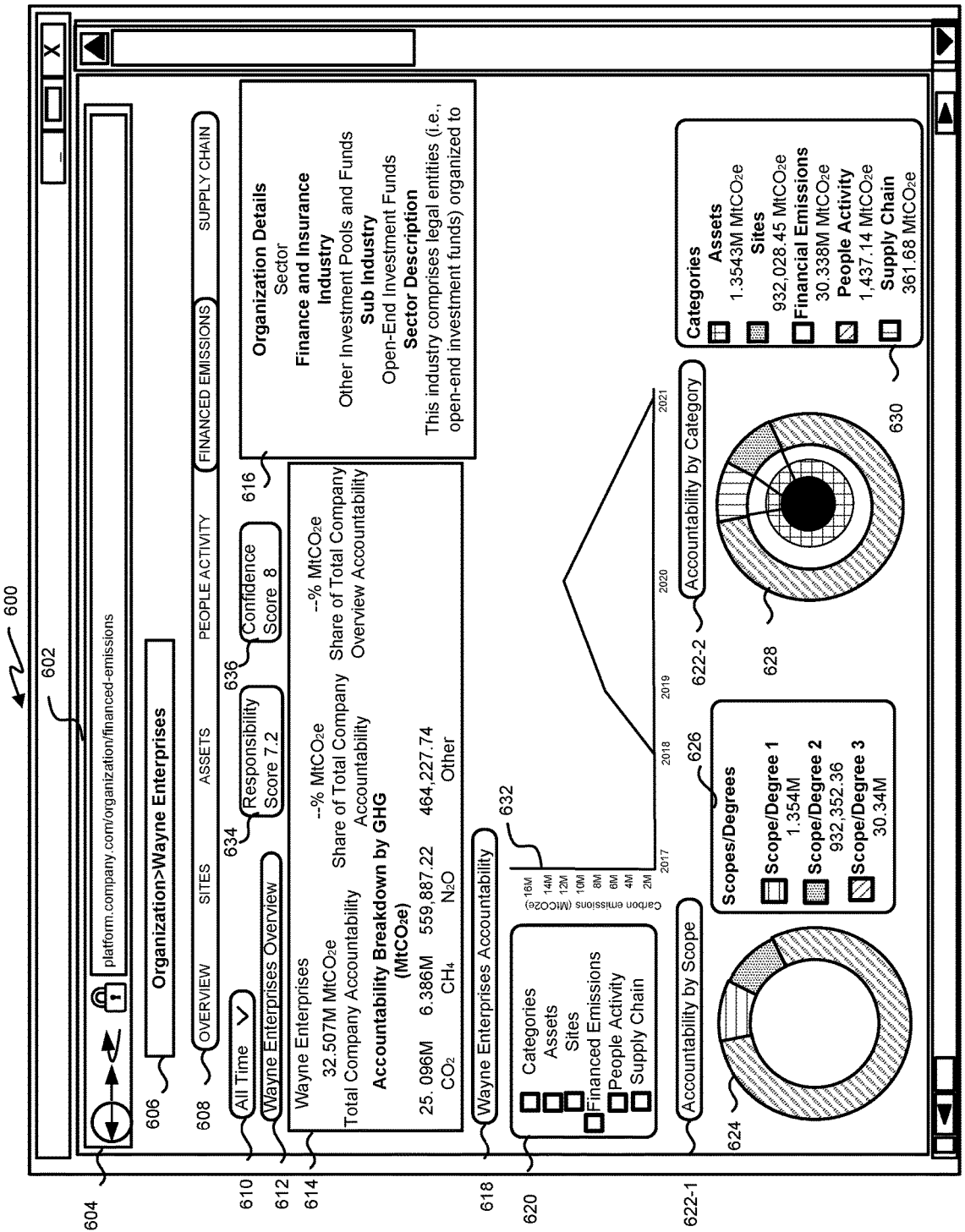
FIGS. 6A-6B illustrates Graphical User Interfaces (GUIs) of a sustainability reporting interface.
Figure 6B:
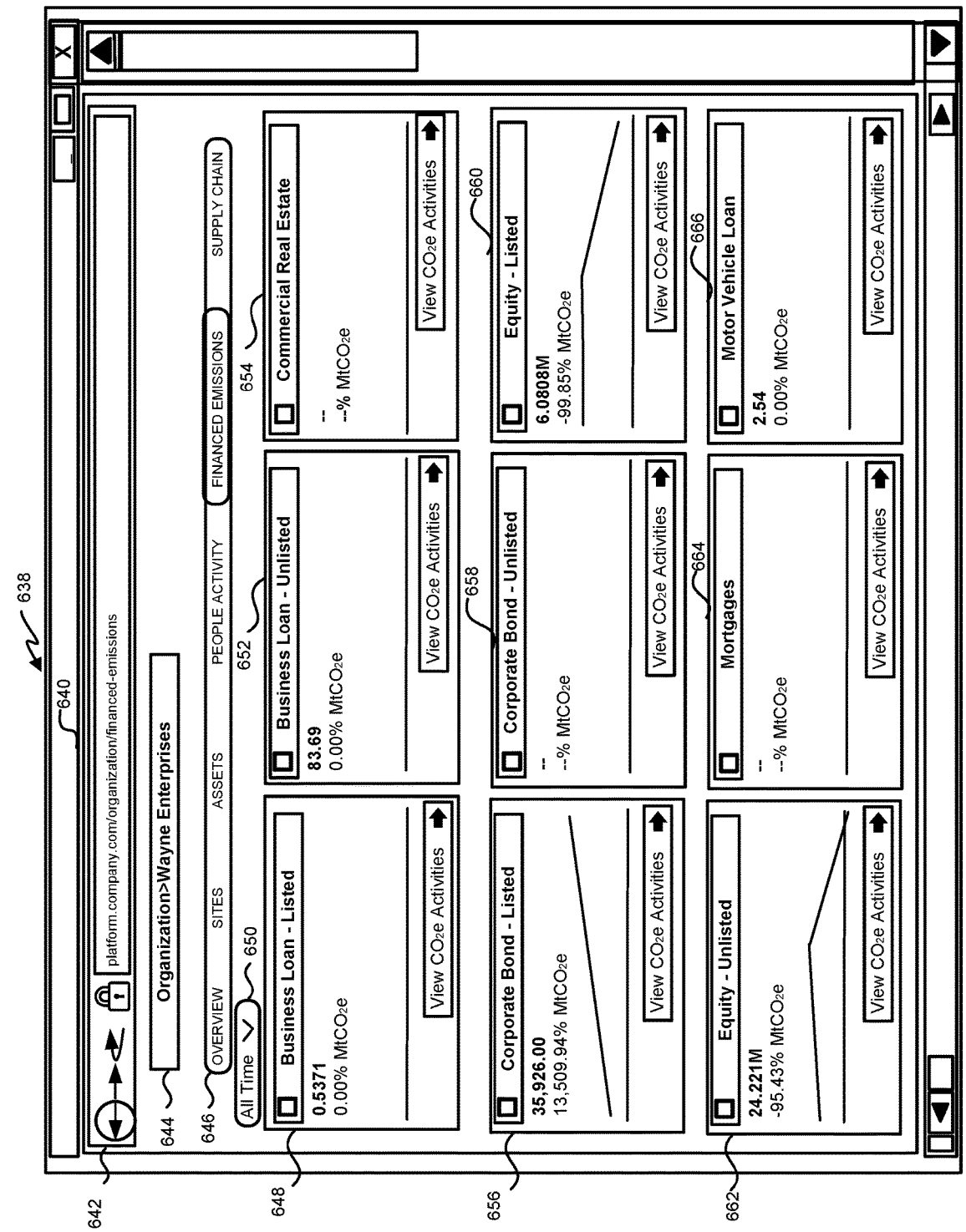

Referring next to FIGS. 6A-6B, Graphical User Interfaces (GUIs) of the sustainability reporting interface 124 is shown according to some embodiment of the present disclosure. In FIG. 6A, GUI 600 displays to a user an example of accountability related to carbon emissions by the enterprise. In another embodiment, other types of accountabilities, for example, pollution, waste generation, expenditure, or electricity use can be displayed on the GUI 600.

Greenhouse emissions include $CO_2$, $CH_4$, $N_2O$, HFCs, $SF_6$, $NF_3$, PFCs as carbon equivalents to create a carbon footprint. A GUI section 602 displays the carbon emissions attributable to a company "Wayne Enterprises". A link section 604 provides a web link to load the sustainability reporting interface 124 of the accountability management system 100. The organization can be selected using a selection tab 606. For example, the selection tab 606, the enterprise can be selected. Different webpages related to the enterprise are displayed in a start tab 608. The start tab 608 displays webpages associated with an overview, sites, assets, people activity, financed emissions, and supply chain. The GUI section 602 is a webpage corresponding to the financed emissions as selected from the start tab 608.

A time period for carbon footprint such as weekly, monthly, yearly, or all-time can be selected from a time selection drop-down menu 610. A company overview field 612 displays an overview of the company. The accountability of the company is displayed in an accountability field 614. The total accountability of the company that is its total carbon emissions is 32.507 M $MtCO_2e$. Percentage share of total company accountability and share of total company overview accountability is also displayed. Accountability breakdown is displayed as carbon emissions/GHG emissions in units of $MtCO_2e$. The breakdown is provided for each type of gas like $CO_2$, $CH_4$, $N_2O$, and others. A responsibility score field 634 displays a responsibility score for the investor. A confidence score field 636 displays a confidence score for the investor. Organizational details are displayed in an organizational field 616.

Enterprise accountability field 618 displays accountability of the enterprise. The accountability is displayed in form of a graph in a graphical field 632. Categories of the enterprise are displayed in a categories field 620. Accountability by the scope is displayed in scope tab 622-1 and accountability by category is displayed in category tab 622-2. A concentric circle 624 shows various scope 1, 2, and 3 emissions which are also referred to as degree 1, 2, and 3 accountabilities. The values of the scopes/degrees are displayed in scopes subsection 626. Another concentric circle 628 shows accountability by category. The values of carbon emissions of the categories are displayed in categories subsection 630.

In FIG. 6B, GUI 638 displays various graphs related to business entities of an enterprise to a user. The graphs display the accountability of the business entities in terms of carbon emissions expressed in $MtCO_2e$. A GUI section 640 displays the financed emissions attributable to a company "Wayne Enterprises". A link section 642 provides a web link to load the sustainability reporting interface 124 of the accountability management system 100. The organization can be selected using a company tab 644. The different webpages related to the enterprise are displayed in a start tab 646. The start tab 646 displays webpages associated with an overview, sites, assets, people activity, financed emissions, and supply chain. The GUI section 640 is a webpage corresponding to the financed emissions as selected from the start tab 646.

A time period for carbon footprint such as weekly, monthly, yearly, or all-time can be selected from a time selection drop-down menu 650. Graph 648 shows carbon emissions corresponding to business loan listed, graph 652 shows carbon emissions corresponding to business loan unlisted, and graph 654 shows carbon emissions corresponding to commercial real estate. The $CO_2e$ activities of the respective business entities can be viewed from the graphs. Graph 656 shows carbon emissions corresponding to a corporate bond listed, graph 658 shows carbon emissions corresponding to corporate bond unlisted, and graph 660 shows carbon emissions corresponding to equity listed. Similarly, graph 662 show carbon emissions corresponding to equity unlisted, graph 664 shows carbon emissions corresponding to mortgages, and graph 666 shows carbon emissions corresponding to a motor vehicle.

Figure 7:
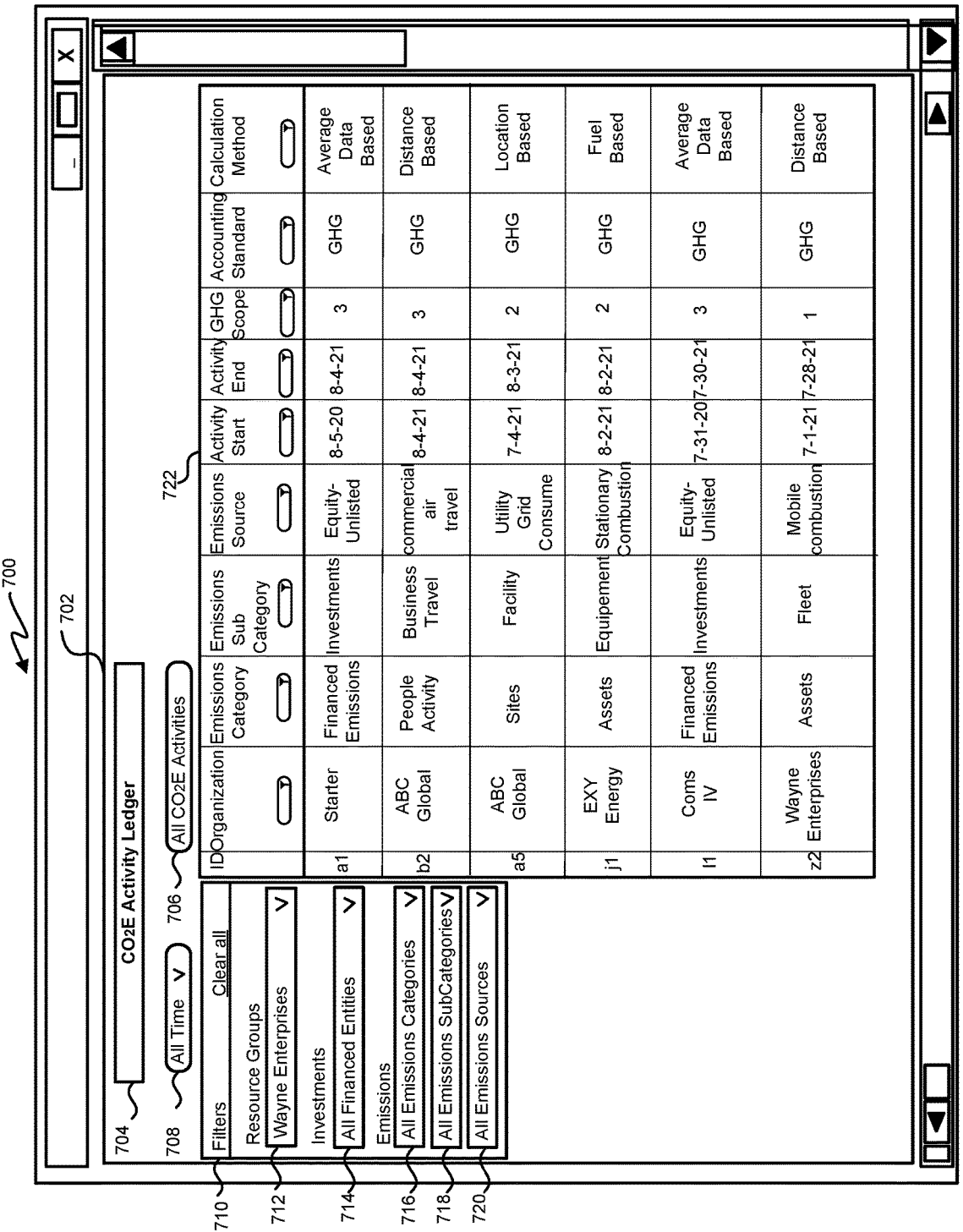
FIG. 7 illustrates a Graphical User Interface (GUI) of a sustainability reporting interface to display carbon activities.

Referring next to FIG. 7, a Graphical User Interface (GUI) 700 of the sustainability reporting interface 124 to display carbon activities is shown according to some embodiment of the present disclosure. The GUI 700 displays $CO_2e$ activities which are considered to be the data gathered for calculating the carbon footprint of the enterprise. A GUI section 702 displays the $CO_2e$ activities of the enterprise. The $CO_2e$ activity ledger is displayed in an activity selection field 704. A time period for carbon footprint such as weekly, monthly, yearly, or all-time can be selected from a time selection drop-down menu 708. $CO_2e$ activities can be selected from an activity tab 706. Filters related to several selections are provided in filter section 710. Resource groups can be selected from a resource drop-down list 712. Investments can be selected from financed entities drop-down list 714. Emissions of categories, subcategories, and sources are selected from respective drop-down lists 716, 718, and 720. The $CO_2e$ activities corresponding to the enterprises are displayed in enterprise activity section 722. Selection fields for the enterprise activity section 722 include an activity identifier (ID), organization name, emissions category, subcategory, and source, activity start and activity end, GHG scope, accounting standard, and calculation method of the carbon emissions are listed along with filters for selection of the respective selection fields.

Figure 8:
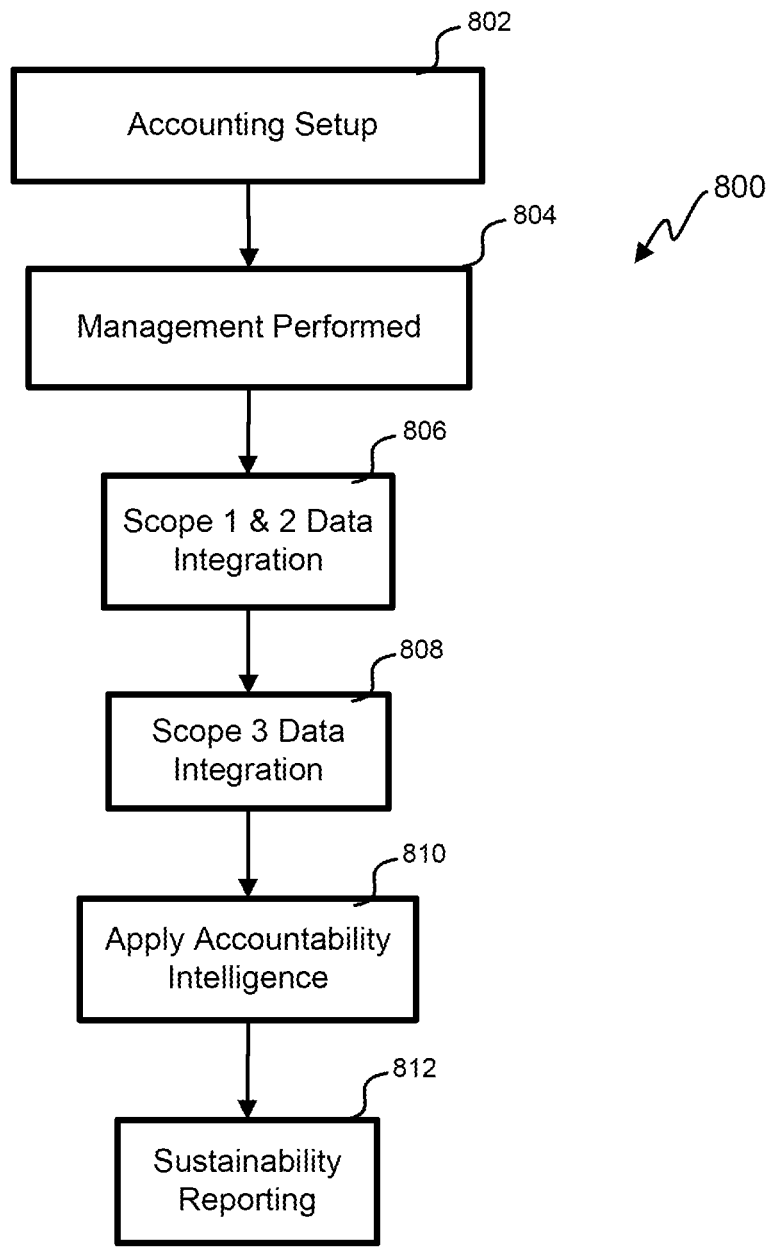
FIG. 8 illustrates a flowchart of an accountability management process for using the accountability management system.

With reference to FIG. 8, an embodiment of a flowchart of an accountability management process 800 for using the accountability management system 100 is shown. The depicted portion of the accountability management process 800 begins at block 802 where the liability accounting interface 112 is manipulated to set up the enterprise hierarchy models 128 and/or financial hierarchy models 168. The organization hierarchy is used for calculating the accountability at each node and layer of the hierarchy. The organization hierarchy includes a plurality of nodes arranged in hierarchical order with layers defining the responsibility of the associated node. For example, starting with the bottommost layer of the facility, nodes belonging to the facility are arranged, business unit, division, and parent company follow the facility next in the hierarchy. The nodes are interconnected based on their association with other nodes.

The accountability management interface 120 can suggest improvements or configuration errors, at block 804 or at any time in the process 500. The suggestions can include switching off unnecessary lights, reducing AC usage, or preventing paper wastage via printouts to reduce accountability.

At block 806, the scope 1 and 2 data integration are configured for the enterprise to feed information into the enterprise hierarchy models 128. Scope 1 and 2 data is gathered from organization data sources. The scope 1 and scope 2 data includes direct data acquired from the facilities and equipment of the enterprise and indirect data acquired from the upstream activity of the enterprise, respectively.

Scope 3 data include indirect gases from sources not owned or directly controlled by the enterprise still related to the company's activities. Scope 3 data is gathered from the organization's data sources. Scope 3 data integration is performed at block 808.

Accountability intelligence interface 116 is applied using ML and/or AI at block 810. The ML algorithms are identified based on a type of scope 1, 2, and 3 data, the node, and the hierarchical level of the node in the organizational hierarchy of the enterprise. Each node is processed using the ML algorithms and then an aggregate offset for the enterprise is determined. A responsibility score corresponding to the aggregate offset is determined for investors. Further, a confidence score is also determined corresponding to the enterprise for the investors.

The sustainability reporting interface 124 is performed at block 812. The aggregate offset, the responsibility score, and the confidence score are displayed to the user for analysis. The user can be the investor, the enterprise, customer or personnel.

Figure 9:
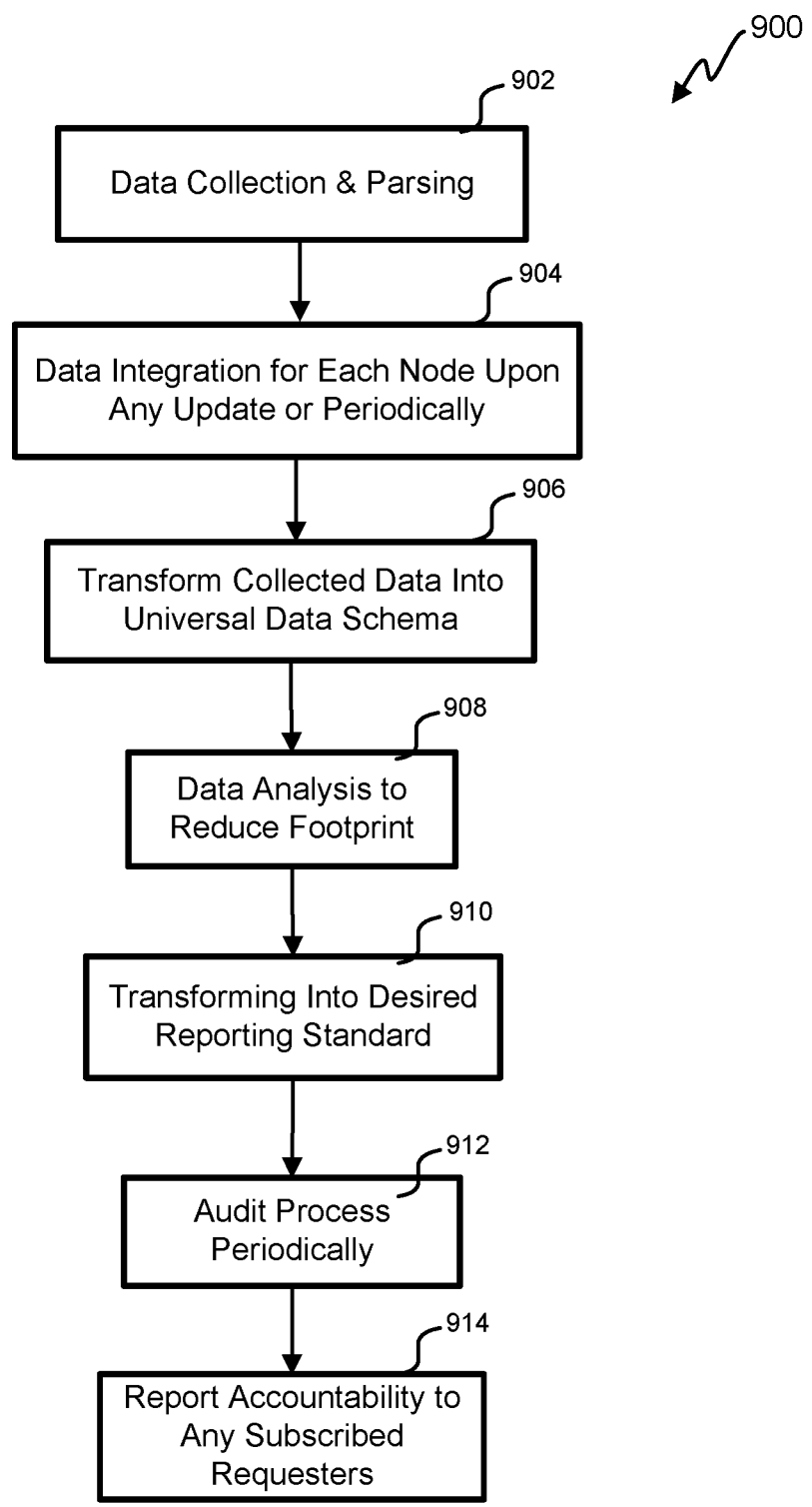
FIG. 9 illustrates a flowchart of an enterprise footprint process that performs real-time reporting of accountability footprint.

Referring next to FIG. 9, an embodiment of a flowchart of an enterprise footprint process 900 that performs real-time reporting of accountability footprint is shown. The depicted portion of the enterprise footprint process 900 begins at block 902 where any data is collected from data sources and parsed. The data can be pushed to the accountability management system 100 or pulled periodically, according to a schedule, or with updated data.

The data is integrated into the enterprise hierarchy models 128 or financial hierarchy models 168 and updated in block 904. The collected data is transformed into the universal data schema 152 by the standard-translator 172 in block 906. Any data analysis with the accountability management interface 120 is performed in block 908 to reduce the accountability footprint. Suggestions can be provided to reduce the footprint such as reducing energy and power usage.

The standard-translator 172 converts the universal data schema 152 to a chosen reporting-standard in block 910. The reporting-standard is understandable by the user and according to standardizations, for example, excel, or pdfs.

Any audit or clean-up of the models, data, and interconnect are performed in block 912. The audit can be done with ML that looks for patterns across many different users of the accountability management system 100 to find mistakes and suggest remediation.

At block 914, the accountability footprint is reported to any subscribed requester, for example, an investor or executive. The accountability is displayed in a standardized format and user-friendly options are provided for better visualization of the accountability. The accountability footprint can be displayed as graphs, pie charts, or heat maps or can be provided as excel or pdf files. Additionally, a responsibility score and a confidence score can also be displayed.

Figure 10:
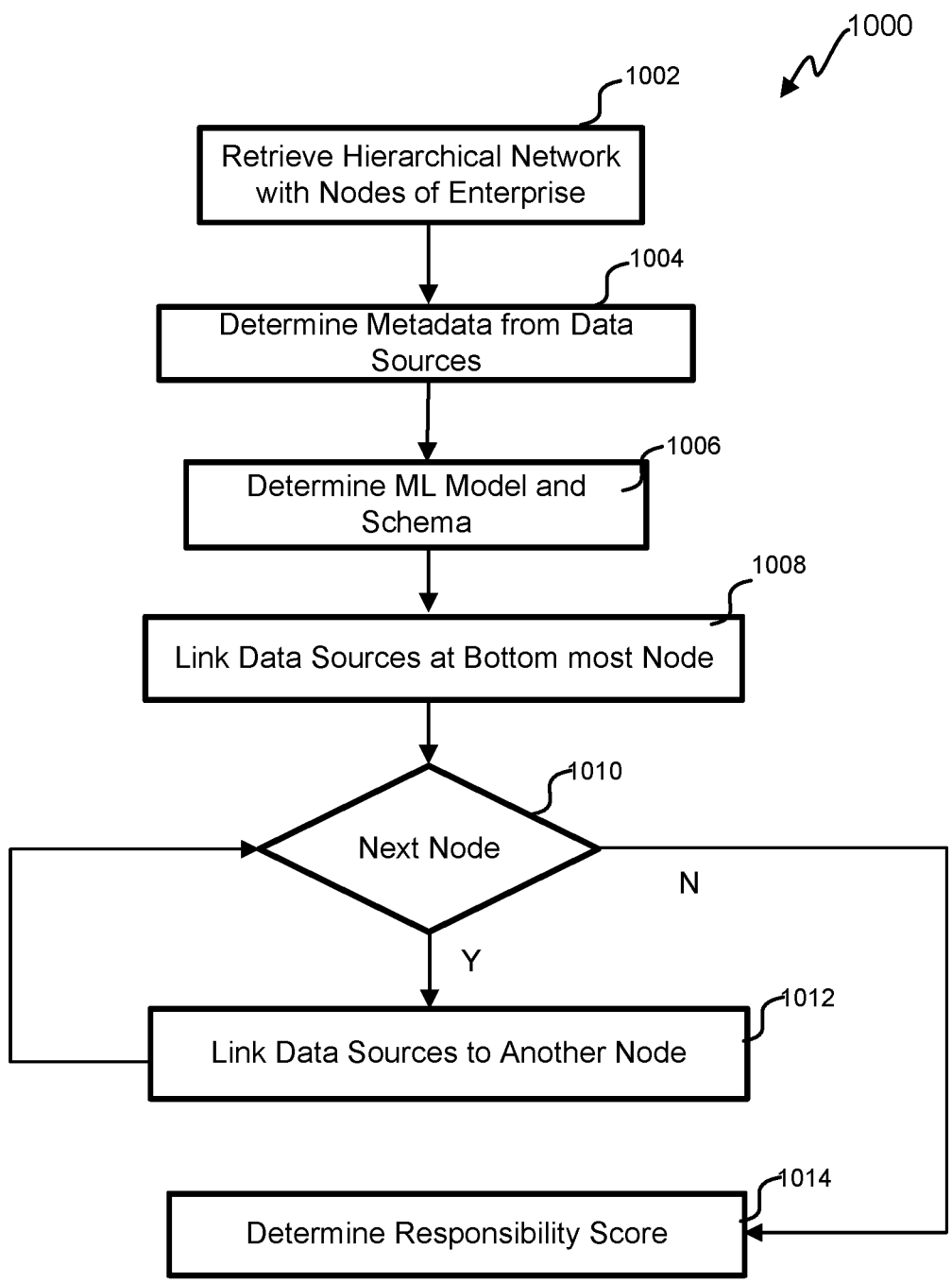
FIG. 10 illustrates a flowchart of an organization structure acquisition process that determines metadata and schema for each node in the organization structure.

Referring next to FIG. 10, an embodiment of a flowchart of an organization structure acquisition process 1000 that determines metadata and schema for each node in the organization structure is shown. The depicted portion of the organization structure acquisition process 1000 begins at block 1002 where a hierarchical network of an enterprise is retrieved. The hierarchical network of the enterprise includes several nodes arranged in a hierarchical order based on the responsibility and reportability to other nodes in the network. The hierarchical network can be provided by a user of the enterprise, an HR system, ERP system or extracted using APIs and/or CSV files. Each node in the hierarchical network is defined to higher nodes in the hierarchical network with one or more equity share, operational control, and financial control.

At block 1004, data corresponding to the accountability is extracted from the data sources, and metadata is determined from the data. The metadata is used in the calculation of the responsibility score. The metadata corresponds to each node of the hierarchical network. The metadata can include scope 1, 2, and 3 data.

At block 1006, a machine learning model and data schema associated with the metadata are determined. The analytics engine 104 determines the ML model in the ML engine 506 and a dynamic schema corresponding to the hierarchical network of the enterprise and the metadata is generated. The dynamic schema interprets the hierarchical network with the nodes and the metadata.

At block 1008, the data sources are linked to the bottom-most node in the bottom-most layer or a first layer of the hierarchical network. The data sources provide a footprint of the node. After linking with the bottom-most node, the footprint of the node is acquired.

At block 1010, the next node in the hierarchical network is determined. Initially, nodes in the bottom-most layer are determined for linking the data sources. Then, nodes in a second layer above the bottom-most layer are selected for linking the data sources one at a time. The data sources of the node of the second layer are linked at block 1012. The data sources of each node of the second layer are linked. Further, the layer above the second layer that is the third layer is selected and data sources of the nodes in the third layer are linked one at a time at block 1012. The process continues until no node and no layer are left.

At block 1014, when the nodes of the hierarchical network have been linked, a responsibility score for investors is determined based on the acquired footprint. A fraction of the footprint is allocated to the enterprise whose transaction from the node defines the fraction. A first degree and a second degree are determined for the enterprise. A third-degree is determined as a function of the fraction. An aggregate offset attributable to the enterprise is determined from the first degree, the second degree, and the third degree. The aggregate offset is allocated to the investors of the enterprise. The responsibility score is determined based on the aggregate offset.

Figure 11:
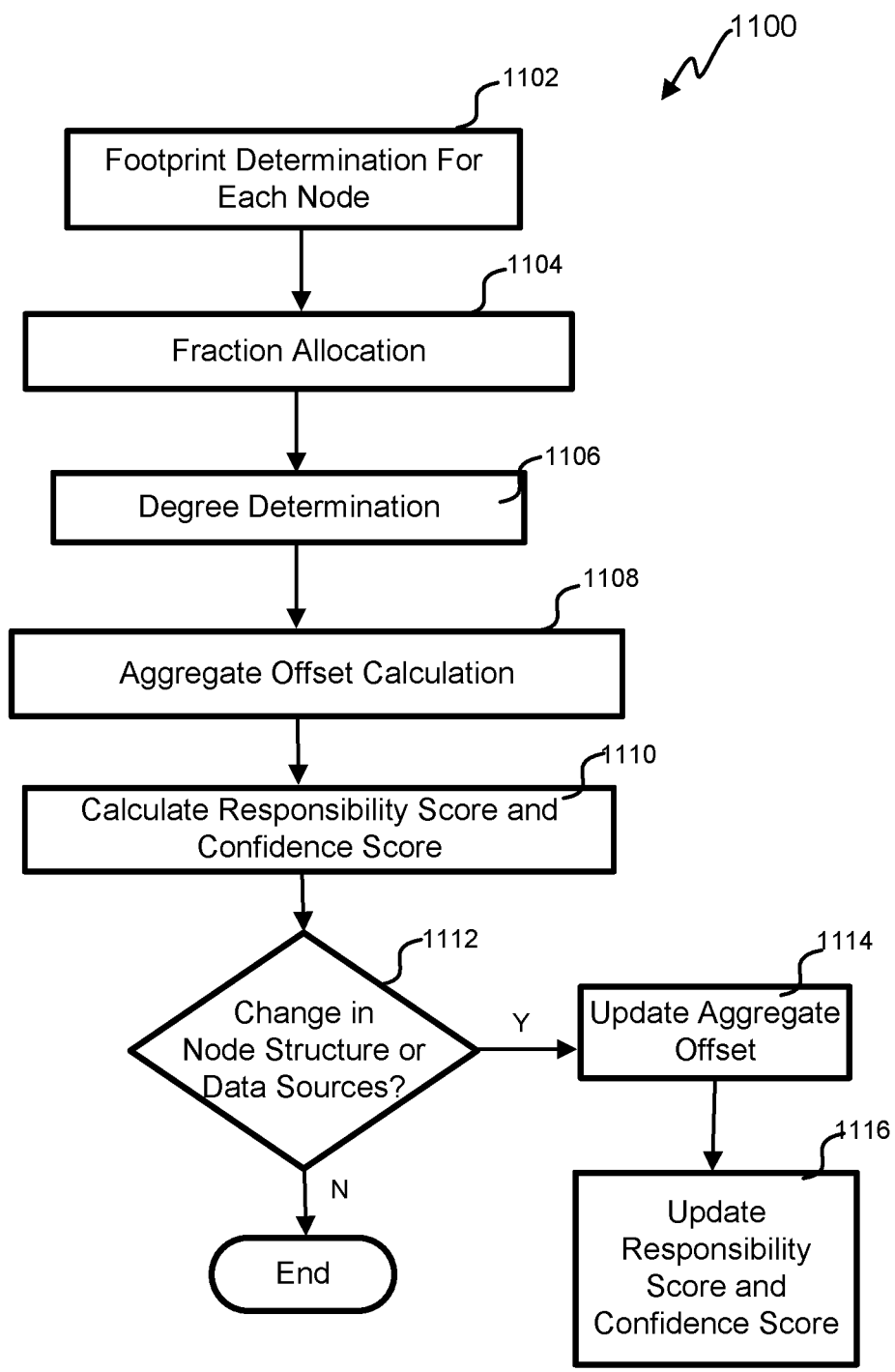
FIG. 11 illustrates a flowchart of a scoring process that determines a responsibility score and a confidence score.

Referring next to FIG. 11, an embodiment of a flowchart of a scoring process 1100 that determines a responsibility score, and a confidence score is shown. The depicted portion of the process 1100 begins at block 1102 where a footprint is determined for each node of a hierarchical network of an enterprise. Additionally, the footprint is determined for each node of the plurality of nodes. Each node has its respective aggregate offset and the responsibility score. The enterprise has the aggregate offset, the responsibility score, and the confidence score for investors. Therefore, every entity in the hierarchical network of the enterprise or associated with it has its accountability in terms of the aggregate offset and the responsibility score.

At block 1104, fractions of the corresponding footprints of the nodes are allocated to the enterprise whose transaction from the respective nodes defines the fractions. For example, if the enterprise has transactions in node 1 and node 2 then a first footprint for node 1 and a second footprint for the node 2. A first fraction of the first footprint and a second fraction of the second footprint is allocated to the enterprise.

At block 1106, a first degree and a second degree are determined for the enterprise from the data sources. A third-degree for the enterprise as a function of the fractions is determined. In an example, the first degree can be scope 1 emission and the second-degree can be scope 2 emission, and the third-degree can be scope 3 emission. The first degree and the second degree are determined for each node and the third degree is determined for each node as a function of each footprint of corresponding nodes.

At block 1108, an aggregate offset attributable to the enterprise from the first degree, the second degree, and the third degree. The aggregate offset is allocated to the investors in the enterprise. The investors are aware of their accountability in terms of the aggregate offset and can take decisions in the enterprise accordingly. For example, the investors cannot invest in the enterprise or can reduce the shares. The aggregate offset is also determined for each node from the first degree, the second degree, and the third degree of the respective node.

At block 1110, the responsibility score for the investors is determined based on the aggregate offset. The responsibility score of each node is determined based on the aggregate offset of the node. The responsibility score can be a numerical value on a scale of 0-10 with 10 being highest and 0 being lowest. The lower value of the responsibility score is suitable for the investors as the accountability is accordingly low. The confidence score is determined based on the aggregate offset. A comparison of the aggregate offset with a previous aggregate offset is used to generate the confidence score. The aggregate offset, the responsibility score, and the confidence score are displayed to the investors or users via the sustainability reporting interface 124.

At block 1112, any change in the node structure that is a change in the number of nodes, their alignment, and connections, or a change in the data sources is determined. If there is a change in the node structure or the data sources, the footprint, the fractions, and the first, the second, and the third degrees also change, and at block 1114, the aggregate offset is updated accordingly. At block 1116, the responsibility score and the confidence score are also updated based on the updated aggregate score. If no change is determined in the node structure or the data sources at block 1112, then the process ends.

A number of variations and modifications of the disclosed embodiments can also be used. For example, the above embodiments describe hierarchies, and matrixes could be used. As the accountability footprint accounting evolves, the algorithms between the nodes could be updated to. Users would be notified of the changes to the algorithm that would affect their accounting.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. An accountability management system comprising:
 a standard-translator means for converting data, from a plurality of data sources, in a first format to a second format of an analytics engine server and data in the second format to the first format;
 a database of a plurality of enterprise hierarchy models, wherein each enterprise hierarchy model is of an enterprise and comprises a hierarchy of interconnected nodes;
 the analytics engine server comprising an input processor, an artificial intelligence (AI) platform server, and an output processor, wherein the AI platform server comprises an auditor, machine learning (ML) software and processing software, wherein the auditor is software, and the analytics engine server is in communication with the plurality of data sources, and further comprises a processor and a memory storing executable instructions that when executed by the processor causes the processor to perform steps of:
receiving, via the input processor, data from the plurality of data sources, wherein the data is in the first format and is associated with an enterprise hierarchy model of the plurality of enterprise hierarchy models;
transmitting, via the input processor, the data to the standard-translator means;
receiving, via the input processor, and from the standard-translator means, the data in the second format and providing the data in the second format to the ML software;
identifying, via the ML software, an ML model for processing the data in the second format;
processing, via the ML software, the data in the second format using the identified ML model;
auditing, via the auditor software, the processed data and verifying, via the auditor software, the identified ML model via the ML software;
transmitting, via the auditor software, the audited data to the processing software;
for each enterprise hierarchical model in the database, via the processing software:
 determining a carbon footprint for each node in the hierarchy of interconnected nodes;
 assigning a fraction of the footprint to the enterprise of the enterprise hierarchical model based on the determined carbon footprints;
 determining a first degree and a second degree for each node in the hierarchy of interconnected nodes using audited data associated with each node and a third degree based on the assigned fraction;
 determining an offset value for the enterprise based on the first, second and third degrees;
 determining a responsibility score for the enterprise based on the offset value;
 determining a change to the enterprise hierarchical model and/or data sources based on the determined change updating the responsibility score;
 transmitting the updated responsibility score to the output processor, wherein the updated responsibility score is in the second format;
transmitting, via the output processor, the updated responsibility score to the standard-translator means;

receiving, via the output processor, and from the standard-translator means, the data in the first format;
generating a sustainability reporting interface;
sending, via the output processor, the updated responsibility score in the first format to the generated sustainability reporting interface; and
displaying, on the generated sustainability reporting interface, the updated responsibility score in the first format.

2. The system as recited in claim 1, wherein the executable instructions further comprise instructions that when executed by the processor causes the processor to perform the step of:
generating a confidence score for investors based on a comparison of the offset value with a previous offset value.

3. The system as recited in claim 1, wherein each of the plurality of data sources is associated with a hierarchy model of the plurality of hierarchy models and the executable instructions further comprise instructions that when executed by the processor causes the processor to perform the step of:
receiving, via the input processor, the data from the plurality of data sources according to the associated hierarchy model.

4. The system as recited in claim 1, wherein the executable instructions further comprise instructions that when executed by the processor causes the processor to perform the step of:
recommending, via the processing software suggestions to reduce the responsibility score to investors.

5. A method performed by an accountability management system comprising a processor, a standard-translator means for converting data, from a plurality of data sources, in a first format to a second format of an analytics engine server and data in the second format to the first format, a database of a plurality of enterprise hierarchy models, wherein each enterprise hierarchy model is of an enterprise and comprises a hierarchy of interconnected nodes, the analytics engine server comprising an input processor, an artificial intelligence (AI) platform server, and an output processor, wherein the AI platform server comprises an auditor, machine learning (ML) software and processing software, wherein the auditor is software, and the analytics engine server is in communication with the plurality of data sources, the method comprising:
receiving, by the processor and via the input processor, data from the plurality of data sources, wherein the data is in the first format and is associated with an enterprise hierarchy model of the plurality of enterprise hierarchy models;
transmitting, by the processor and via the input processor, the data to the standard-translator means;
receiving, by the processor and via the input processor, and from the standard-translator means, the data in the second format and providing the data in the second format to the ML software;
identifying, by the processor and via the ML software, an ML model for processing the data in the second format;
processing, by the processor and via the ML software, the data in the second format using the identified ML model;
auditing, by the processor and via the auditor software, the processed data and verifying, by the auditor software, the identified ML model by the ML software;
transmitting, by the processor and via the auditor software, the audited data to the processing software;
for each enterprise hierarchical model in the database, the processor and via the processing software:
determining a carbon footprint for each node in the hierarchy of interconnected nodes;
assigning a fraction of the footprint to the enterprise of the enterprise hierarchical model based on the determined carbon footprints;
determining a first degree and a second degree for each node in the hierarchy of interconnected nodes using audited data associated with each node and a third degree based on the assigned fraction;
determining an offset value for the enterprise based on the first, second and third degrees;
determining a responsibility score for the enterprise based on the offset value;
determining a change to the enterprise hierarchical model and/or data sources based on the determined change updating the responsibility score;
transmitting the updated responsibility score to the output processor, wherein the updated responsibility score is in the second format;
transmitting, by the processor and via the output processor, the updated responsibility score to the standard-translator means;
receiving, by the processor and via the output processor, and from the standard-translator means, the data in the first format;
generating, by the processor, a sustainability reporting interface;
sending, by the processor and via the output processor, the updated responsibility score in the first format to the generated sustainability reporting interface; and
displaying, by the processor, on the generated sustainability reporting interface, the updated responsibility score in the first format.

6. The method as recited in claim 5, further comprising generating, by the processor and via the processing software, a confidence score for investors based on a comparison of the offset value with a previous offset value.

7. The method as recited in claim 5, wherein each of the plurality of data sources is associated with a hierarchy model of the plurality of hierarchy models and the method further comprises:
receiving, by the processor and via the input processor, the data from the plurality of data sources according to the associated hierarchy model.

8. The method as recited in claim 5, further comprising recommending, by the processor and via the processing software, suggestions to reduce the responsibility score to investors.

9. A non-transitory computer-readable storage medium of an accountability management system, the system comprising:
a processor;
a standard-translator means for converting data, from a plurality of data sources, in a first format to a second format of an analytics engine server and data in the second format to the first format;
a database of a plurality of enterprise hierarchy models, wherein each enterprise hierarchy model is of an enterprise and comprises a hierarchy of interconnected nodes;
the analytics engine server comprising an input processor, an artificial intelligence (AI) platform server, and an output processor, wherein the AI platform server comprises an auditor, machine learning (ML) software and processing software, wherein the auditor is software, and the analytics engine server is in communication with the plurality of data sources, the medium storing computer-executable instructions that, when executed by the processor, causes the processor to perform the steps of:

receiving, via the input processor, data from the plurality of data sources, wherein the data is in the first format and is associated with an enterprise hierarchy model of the plurality of enterprise hierarchy models;

transmitting, via the input processor, the data to the standard-translator means;

receiving, via the input processor, and from the standard-translator means, the data in the second format and providing the data in the second format to the ML software;

identifying, via the ML software, an ML model for processing the data in the second format;

processing, via the ML software, the data in the second format using the identified ML model;

auditing, via the auditor software, the processed data and verifying, via the auditor software, the identified ML model via the ML software;

transmitting, via the auditor software, the audited data to the processing software;

for each enterprise hierarchical model in the database, via the processing software:

determining a carbon footprint for each node in the hierarchy of interconnected nodes;

assigning a fraction of the footprint to the enterprise of the enterprise hierarchical model based on the determined carbon footprints;

determining a first degree and a second degree for each node in the hierarchy of interconnected nodes using audited data associated with each node and a third degree based on the assigned fraction;

determining an offset value for the enterprise based on the first, second and third degrees;

determining a responsibility score for the enterprise based on the offset value;

determining a change to the enterprise hierarchical model and/or data sources based on the determined change updating the responsibility score;

transmitting the updated responsibility score to the output processor, wherein the updated responsibility score is in the second format;

transmitting, via the output processor, the updated responsibility score to the standard-translator means;

receiving, via the output processor, and from the standard-translator means, the data in the first format;

generating a sustainability reporting interface;

sending, via the output processor, the updated responsibility score in the first format to the generated sustainability reporting interface; and displaying, on the generated sustainability reporting interface, the updated responsibility score in the first format.

10. The non-transitory computer-readable storage medium as recited in claim 9, wherein the computer-executable instructions further comprise instructions that when executed by the processor, causes the processor to perform the step of:

generating, via the processing software, a confidence score for investors based on a comparison of the offset value with a previous offset value.

11. The non-transitory computer-readable storage medium as recited in claim 9, wherein each of the plurality of data sources is associated with a hierarchy model of the plurality of hierarchy models and the executable instructions further comprise instructions that when executed by the processor, causes the processor to perform the step of:

receiving, via the input processor, the data from the plurality of data sources according to the associated hierarchy model.

12. The non-transitory computer-readable storage medium as recited in claim 9, wherein the computer-executable instructions further comprise instructions that when executed by the processor, causes the processor to perform the step of:

recommending, via the processing software, suggestions to reduce the responsibility score to investors.

* * * * *